United States Patent
Zhang et al.

(10) Patent No.: US 10,044,420 B2
(45) Date of Patent: Aug. 7, 2018

(54) CLOSED-LOOP MASSIVE MIMO SYSTEM ARCHITECTURE

(71) Applicant: Hong Kong Applied Science and Technology Research Institute Company Limited, Hong Kong (HK)

(72) Inventors: Yuxian Zhang, Hong Kong (HK); Man Wai Kwan, Hong Kong (HK); Eric Kong Chau Tsang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 138 days.

(21) Appl. No.: 15/379,635

(22) Filed: Dec. 15, 2016

(65) Prior Publication Data

US 2018/0175915 A1 Jun. 21, 2018

(51) Int. Cl.
| | | |
|---|---|---|
| *H04B 7/0417* | (2017.01) | |
| *H04B 7/0456* | (2017.01) | |
| *H04W 72/04* | (2009.01) | |
| *H04B 7/0452* | (2017.01) | |
| *H04W 72/08* | (2009.01) | |

(52) U.S. Cl.
CPC ......... *H04B 7/0417* (2013.01); *H04B 7/0452* (2013.01); *H04B 7/0473* (2013.01); *H04W 72/046* (2013.01); *H04W 72/082* (2013.01)

(58) Field of Classification Search
CPC .. H04B 7/0417; H04B 7/0473; H04B 7/0452; H04W 72/046; H04W 72/082
See application file for complete search history.

(56) References Cited

U.S. PATENT DOCUMENTS

| | | | |
|---|---|---|---|
| 2008/0192849 A1 | 8/2008 | Kim et al. | |
| 2010/0039928 A1 | 2/2010 | Noh et al. | |
| 2011/0244847 A1 | 10/2011 | Mallik et al. | |
| 2016/0072562 A1 | 3/2016 | Onggosanusi et al. | |
| 2016/0182137 A1 | 6/2016 | Onggosanusi et al. | |
| 2016/0337017 A1* | 11/2016 | Moon ................... | H04B 7/0617 |
| 2017/0201980 A1* | 7/2017 | Hakola ............. | H04W 72/0446 |
| 2018/0102817 A1* | 4/2018 | Park ..................... | H04B 7/0417 |

FOREIGN PATENT DOCUMENTS

WO 2016052824 A1 4/2016

* cited by examiner

*Primary Examiner* — Chirag Shah
*Assistant Examiner* — Joshua Smith
(74) *Attorney, Agent, or Firm* — Spruson & Ferguson (Hong Kong) Limited (57) ABSTRACT

A method for transmitting payload data from a base station (BS) to a user equipment (UE) via a MIMO channel is provided. Channel estimation is performed first and the channel-estimation result is used for optimizing data transmission. Instead of reporting CQI, RI and PMI to the BS, the UE reports a first channel transfer function characterizing an end-to-end process of obtaining received CSI-RS symbols from originally-sent CSI-RS symbols. Computation burden at the UE is reduced as computation of the CQI, RI and PMI is eliminated. At the BS, an effect caused by the antenna port-to-transceiver unit (AP-to-TXRU) virtualization operation is removed from the first channel transfer function to yield a second channel transfer function. With the second channel transfer function closer to the MIMO channel transfer function than the first one, the "content" of the MIMO channel is better utilized in optimizing data-transmission performance.

14 Claims, 5 Drawing Sheets

CLOSED-LOOP MASSIVE MIMO SYSTEM ARCHITECTURE

FIELD OF THE INVENTION

The present invention generally relates to a multiple-input multiple-output (MIMO) wireless communication system. In particular, the present invention relates to closed-loop channel estimation, feedback and data transmission of the MIMO wireless communication system having a large number of antenna elements (AEs), such as a massive MIMO system.

BACKGROUND

The massive MIMO communication technique, which employs tens or even hundreds of antenna elements (AEs) at a base station (BS) for communicating with a user equipment (UE), is to be adopted in forthcoming mobile communication systems. The advantage of using a large number of AEs is to provide a large beamforming gain, a high spatial resolution, a large diversity gain and a large spatial-multiplexing gain. In order to optimize data transmission for approaching the channel capacity of a MIMO communication system, the BS transmits channel state information- (CSI-) reference signal (RS) to the UE for estimating the MIMO channel, and the UE returns CSI to the BS so as to enable the BS to optimize the data transmission.

Figure 1:
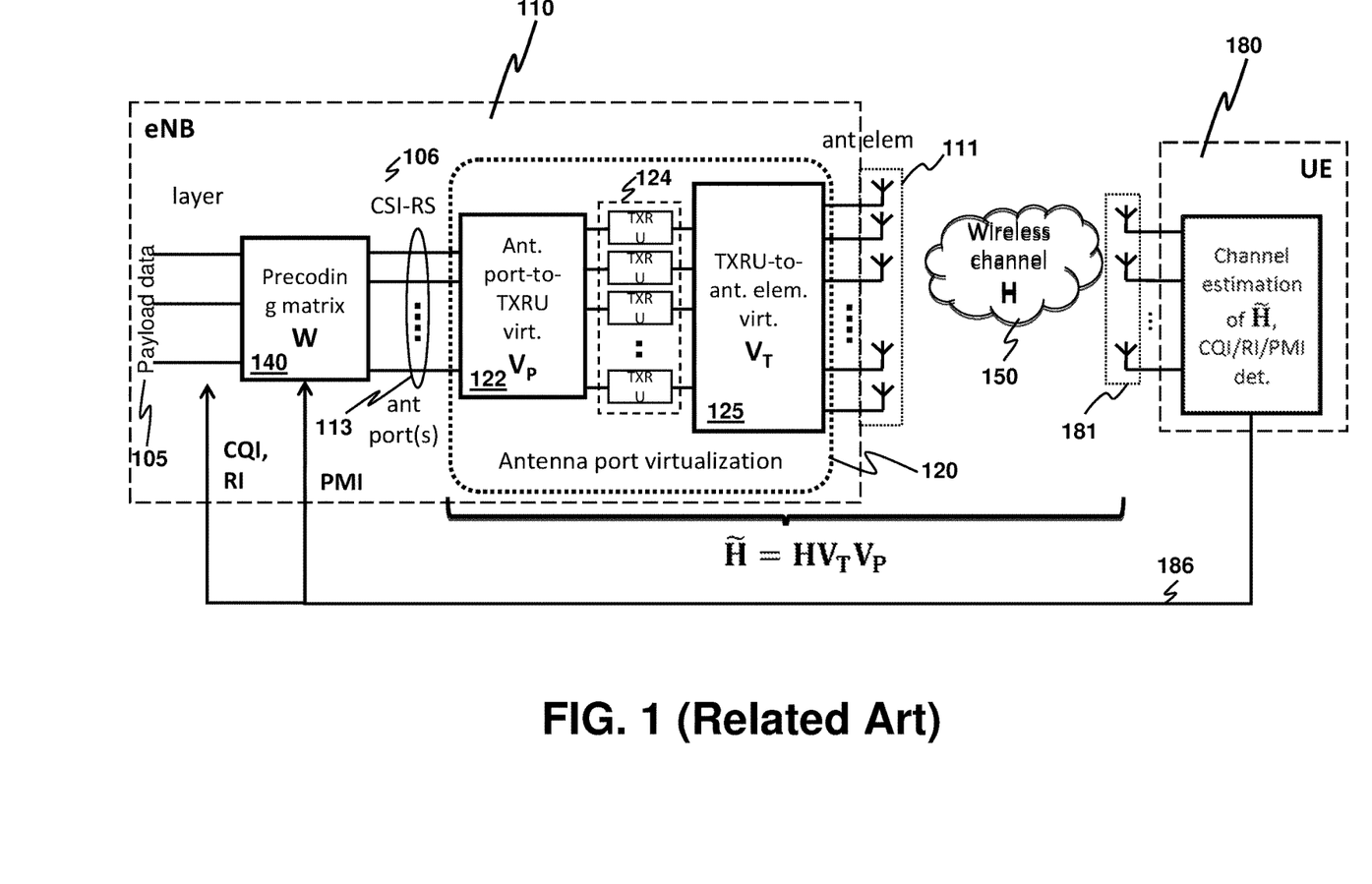
FIG. 1 depicts, in accordance with the LTE and LTE-A specifications, a typical architecture of a BS for channel estimation, feedback and data transmission under a constraint that there are a limited number of TXRUs.

In implementing a BS with a large number of AEs, the conventional fully digital beamforming methods which require one transceiver unit (TXRU) per antenna element is not cost effective. Therefore, the number of TXRUs is considered to be less than the number of AEs in practical massive MIMO systems. FIG. 1 depicts, according to the Long Term Evolution (LTE) and LTE-Advanced (LTE-A) specifications, a typical architecture of a BS 110 (known as an eNodeB in the LTE and LTE-A specifications) for optimizing data transmission under a constraint that the number of TXRUs 124 is less than the number of AEs 111. First, the number of antenna ports (APs) 113 is determined. According to the LTE or LTE-A specification, an AP is a logical input port to digital data symbols, defined such that the channel over which a symbol on the AP is conveyed can be inferred from the channel over which another symbol on the same AP is conveyed. The number of APs 113 is less than or equal to the number of TXRUs 124 and hence is less than or equal to the number of AEs 111.

The mapping of the APs 113 to the AEs 111 is done by an AP virtualization process 120 as follows. First, a digital modulation-symbol vector for input to the APs 113 are processed by an AP-to-TXRU virtualization operation 122, modeled by an AP-to-TXRU virtualization matrix $V_P$, to yield a resultant modulation-symbol vector. The resultant modulation-symbol vector is converted to a plurality of analog TXRU signals by the TXRUs 124. The analog TXRU signals are then processed with a TXRU-to-AE virtualization operation 125, modeled by a TXRU-to-AE virtualization matrix $V_T$, to give analog signals to be transmitted on the AEs 111. Analog beamforming is the main purpose of the TXRU-to-AE virtualization operation 125 so that an analog network comprising phase shifters and adders is usually used to implement the TXRU-to-AE virtualization operation 125. The analog signals are transmitted to a UE 180 having plural AEs 181 over a MIMO channel 150. The MIMO channel 150 has a channel transfer function H.

In data transmission, payload data 105 are mapped to one or more layers by layer mapping. The payload data 105 after layer mapping are precoded by a precoding operation 140, modeled by a precoding matrix W, for achieving spatial multiplexing or transmit diversity. Then the precoded data are processed by the AP virtualization process 120 for transmission over the AEs 111.

The BS 110 requires the UE 180 to estimate the MIMO channel 150 to optimize data transmission. The BS 110 generates a CSI-RS as a pilot signal for channel estimation. According to the LTE or LTE-A specification, a plurality of CSI-RS symbols 106 is first determined and is processed by the AP virtualization process 120 to generate the pilot signal. Upon receiving the pilot signal, the UE 180 recovers the CSI-RS symbols, and hence estimates $\hat{H}=HV_T V_P$. Based on the estimated $\hat{H}$, the UE 180 computes CSI and feedbacks the CSI to the BS 110 through an uplink channel 186. The CSI includes a channel quality indicator (CQI), a rank indication (RI), and a precoding matrix indicator (PMI). Regarding error performance, the combination of modulation scheme and transport block size as indicated in the returned CQI could be achieved with a transport block error probability not exceeding 0.1. For spatial multiplexing, the RI corresponds to the number of useful transmission layers. The UE reports which W is preferred to be used through the PMI.

There are some drawbacks with the current CSI acquisition scheme. First, the AP virtualization pattern is restricted to a limited number of choices. In the LTE and LTE-A specifications, there are only two choices, either a one-to-one mapping which corresponds to the so called "non-precoded CSI-RS" or a one-to-all (for each polarization) mapping which corresponds to the so called "beamformed CSI-RS". Having a limited number of choices is not flexible for fully optimizing data transmission. Second, the UE 180 is required to determine the CQI, RI and PMI. Huge computation complexity is involved as the number of APs 113 is large for a massive MIMO system. Third, determining W under the given AP-to-TXRU virtualization matrix $V_P$ does not give optimal performance in data transmission for some AP-to-TXRU virtualization patterns. Suboptimal performance leads to an inefficient use of the MIMO channel 150.

In the art, there have been some efforts aimed at addressing the aforementioned problems. For approaching an optimal performance, US20160072562 suggests that the BS determines a finite set of basis vectors based on uplink measurement, and signals the UE with a selected basis-vector subset. The UE then calculates the coefficients with respect to the selected basis-vector subset based on the channel estimate and informs the BS. However, signaling the UE with the selected basis-vector subset induces extra signaling overhead. Furthermore, the UE is required to derive channel coefficients based on the selected subset, increasing the computation burden of the UE. In WO2016052824, new, extra CSI-RS type indicators with virtualization information are sent to the UE for the UE to determine the CQI, RI and PMI. Although the data transmission performance can be improved, this approach also suffers from extra signaling load and increased computation burden on the UE.

There is still a need in the art for a technique to improve data transmission performance by optimizing the use of the MIMO channel without placing extra burdens on signaling and on computation requirement of the UE.

SUMMARY OF THE INVENTION

The present invention provides a method for transmitting payload data from a BS having plural BS AEs to a UE having plural UE AEs via a MIMO channel. The BS also has plural TXRUs each for generating a TXRU signal from an individual modulation-symbol sequence.

In the method, the BS determines an AP-to-TXRU virtualization operation and a TXRU-to-AE virtualization operation. A concatenation of the AP-to-TXRU virtualization operation and the TXRU-to-AE virtualization operation yields an AP virtualization mapping.

Afterwards, plural pilot signals for channel estimation are generated by the BS by processing pre-determined CSI-RS symbols with a first cascade of the AP-to-TXRU virtualization operation, an operation of generating the TXUR signals by the TXRUs, and the TXRU-to-AE virtualization operation. The pilot signals are transmitted to the UE via the BS AEs.

The BS then receives a first channel transfer function from the UE. The first channel transfer function characterizes an end-to-end process of obtaining received CSI-RS symbols recovered at the UE from the pre-determined CSI-RS symbols.

After receiving the first channel transfer function, the BS estimates a second channel transfer function by removing, from the first channel transfer function, an effect caused by the AP-to-TXRU virtualization operation.

With a knowledge of the second channel transfer function, the BS determines: a modulation scheme, a code rate and an efficiency for the payload data; a first number of one or more layers for layer mapping the payload data; and a precoding operation used for achieving spatial multiplexing or transmit diversity by precoding the payload data after layer mapping. In particular, the payload data are mapped to the one or more layers for achieving spatial multiplexing with a degree of spatial multiplexing being dependent on the determined first number without being restricted by the AP virtualization mapping. Thereafter, the BS determines a precoding operation according to the determined first number and the second channel transfer function. The precoding operation is used for achieving spatial multiplexing or transmit diversity by precoding the payload data after layer mapping.

The BS then generates plural data signals from the payload data by processing the payload data after layer mapping with a second cascade of the precoding operation, the operation of generating the analog TXUR signals by the TXRUs, and the TXRU-to-AE virtualization operation. The data signals are transmitted to the UE over the MIMO channel.

The method is implementable in a BS comprising plural BS AEs, plural TXRUs, an analog network and one or more processors. Each of the TXRUs is used for generating a TXRU signal from an individual modulation-symbol sequence. The analog network is used for realizing a TXRU-to-AE virtualization operation that processes and maps the plural TXRU signals generated by the TXRUs to the BS AEs for transmission. The one or more processors perform computing and controlling functions. The controlling functions include controlling the TXRUs, and configuring the analog network to realize the TXRU-to-AE virtualization operation. In particular, the TXRUs, the analog network and the one or more processors are arranged to transmit payload data according to the disclosed method.

Other aspects of the present invention are disclosed as illustrated by the embodiments hereinafter.

DETAILED DESCRIPTION

An aspect of the present invention is to provide a method for transmitting payload data from a BS to a UE via a MIMO channel. Particularly, the method as disclosed herein is intended to optimize data-transmission performance while reducing the UE's computation load by eliminating the computation of CQI, RI and PMI. In the method, channel estimation is first performed by sending pilot signals to the UE before the payload data are transmitted. The channel estimation result is closed-loop feedback from the UE to the BS, and is used by the BS to optimize the processing of the payload data for transmission.

Figure 2:
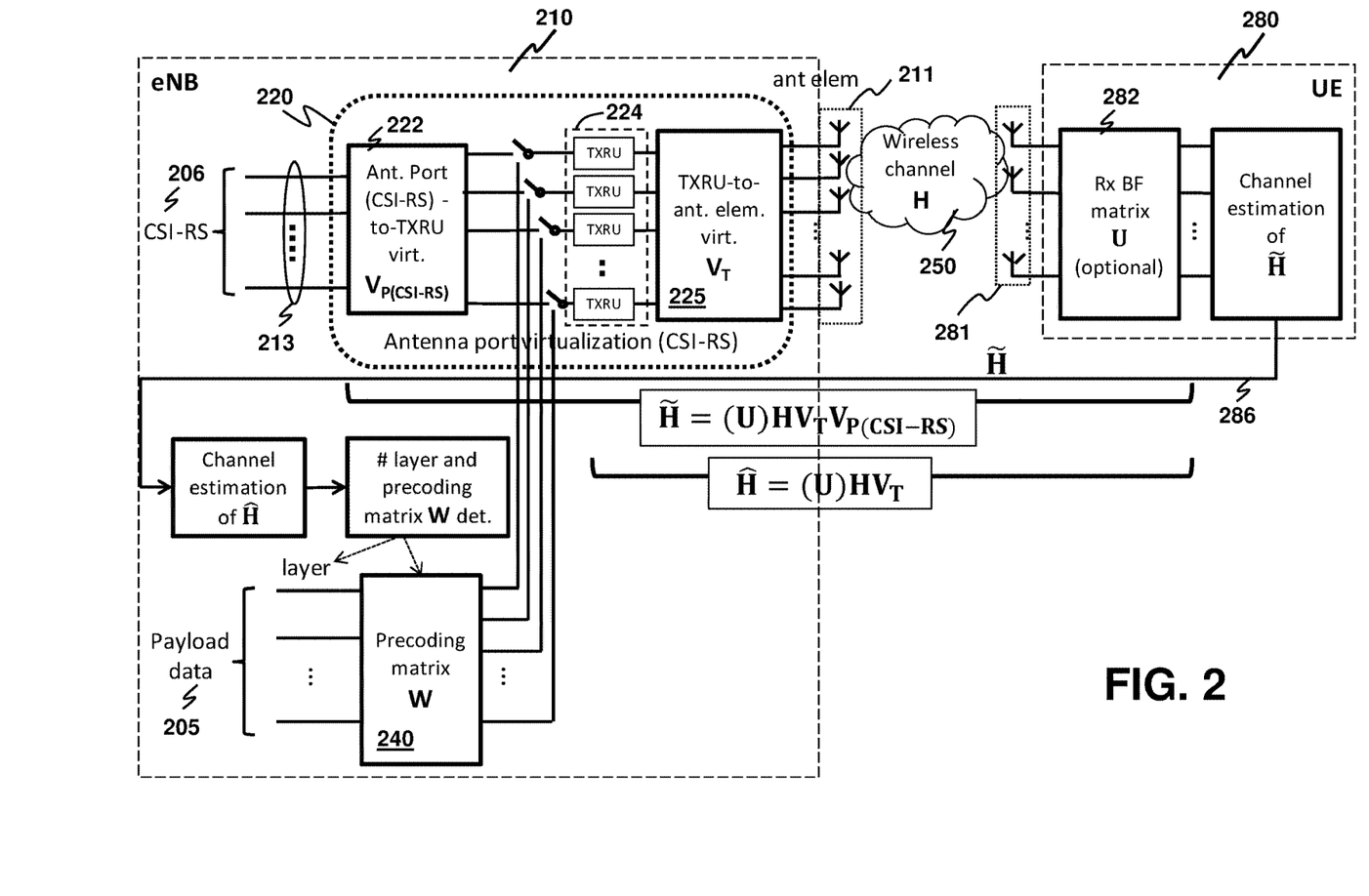
FIG. 2 depicts an exemplary system architecture of the BS, where the system architecture is adapted for supporting optimization of CSI acquisition and data transmission.
Figure 3:
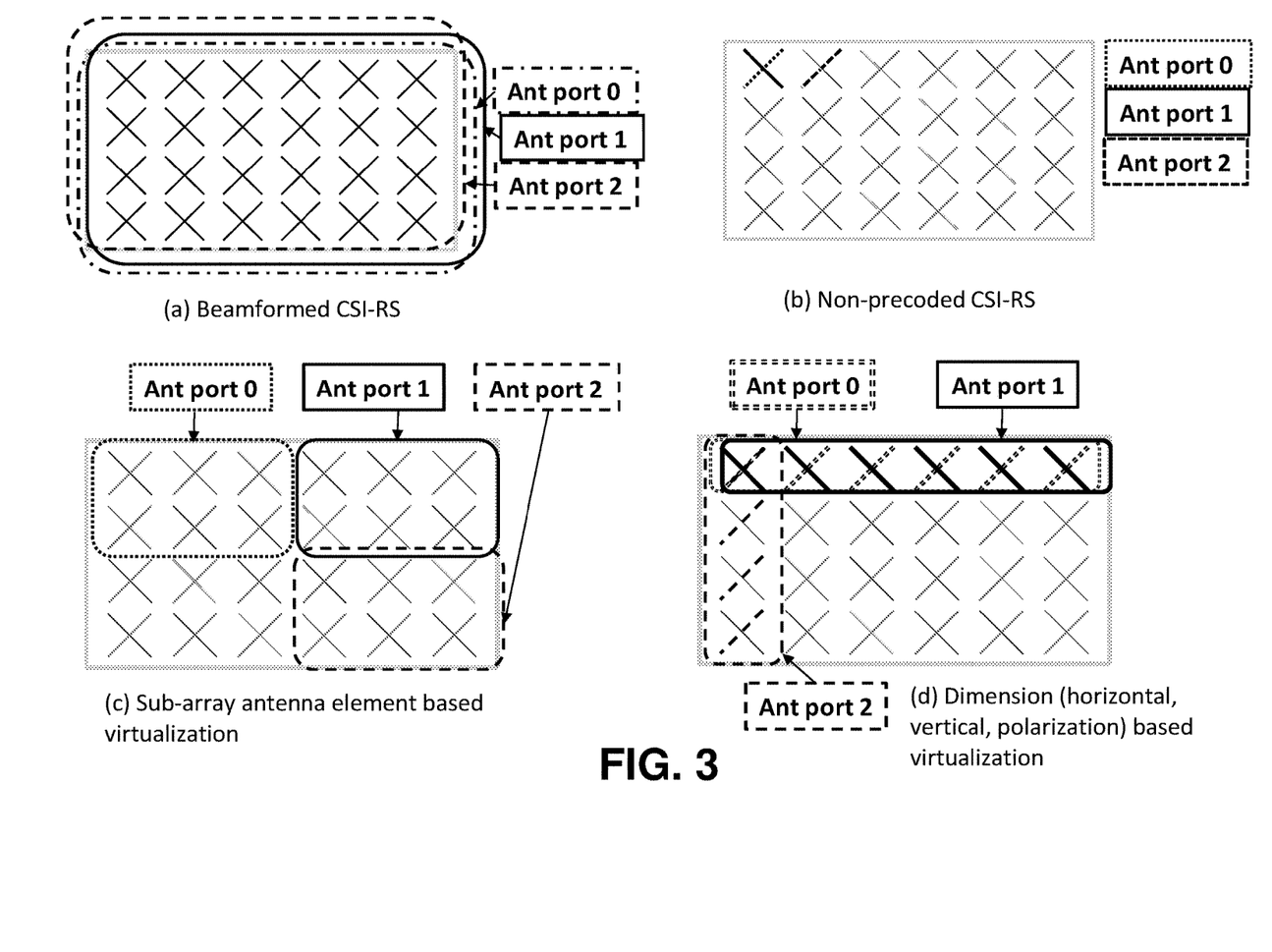
FIG. 3 depicts different examples of mapping AEs to APs in the AP virtualization process.

The method is illustrated with the aid of FIGS. 2 and 3. FIG. 2 depicts an exemplary system architecture of the BS for supporting the disclosed method. A BS 210 is intended to transmit payload data 205 to a UE 280 through a downlink that includes a MIMO channel 250 as a radio channel. The BS 210 has plural BS AEs 211 and the UE 280 has plural UE AEs 281. Furthermore, the BS 210 has plural TXRUs 224 each for generating a TXRU signal from an individual modulation-symbol sequence. Exemplarily, the method is depicted by a flowchart shown in FIG. 4.

Figure 4:
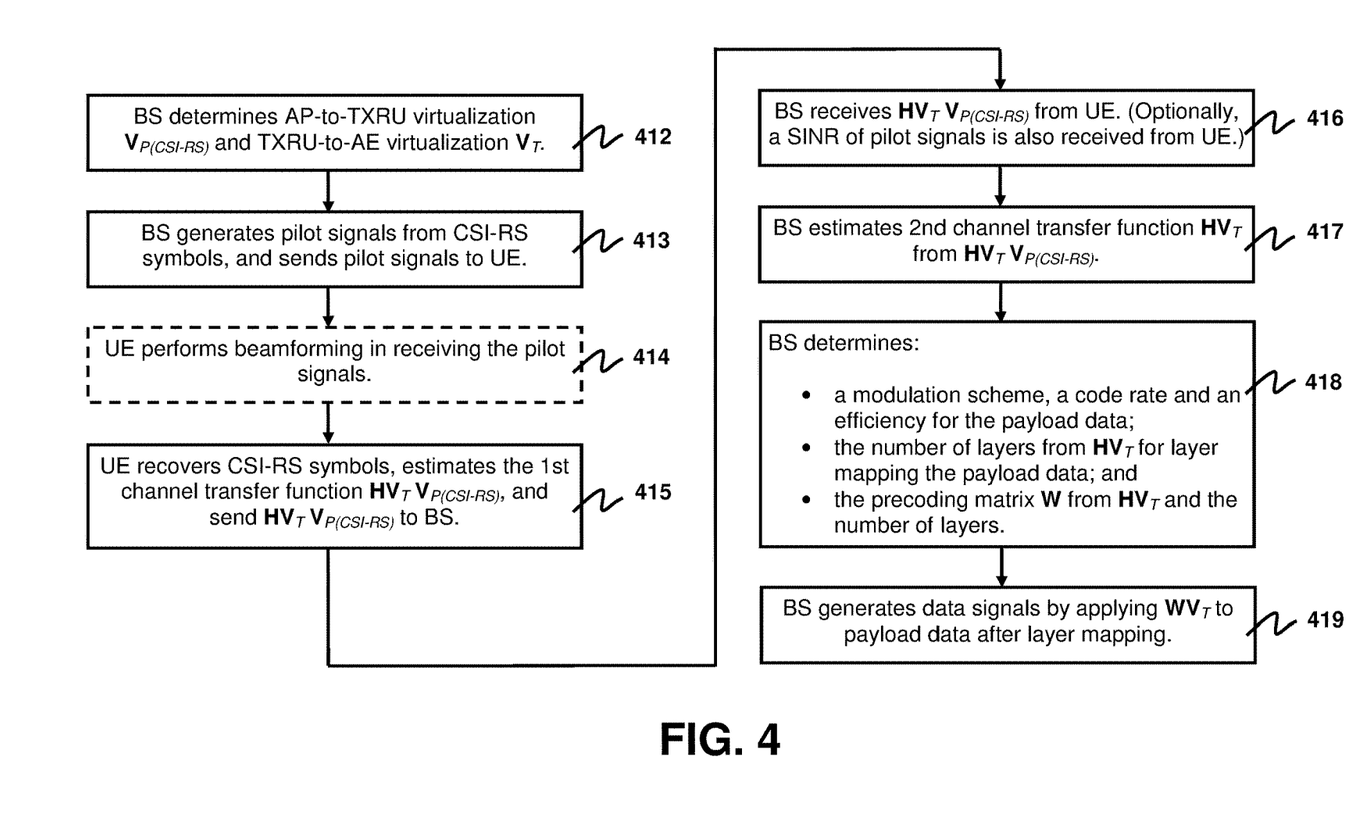
FIG. 4 is a flowchart illustrating a method for transmitting payload data from the BS to UE with channel estimation in accordance with an exemplary embodiment of the present invention.

In a first step 412, the BS determines an AP-to-TXRU virtualization operation 222 and a TXRU-to-AE virtualization operation 225. The AP-to-TXRU virtualization operation 222 and the TXRU-to-AE virtualization operation 225 are modeled by an AP-to-TXRU virtualization matrix $V_{P(CSI\text{-}RS)}$ and a TXRU-to-AE virtualization matrix $V_T$, respectively. Usually, the AP-to-TXRU virtualization operation 222 is determined according to the UE-specific channel statistics. For the TXRU-to-AE virtualization operation 225, it is usually determined according to the beamforming pattern for a particular OFDM symbol/time slot/subframe. Note that a concatenation of the AP-to-TXRU virtualization operation 222 and the TXRU-to-AE virtualization operation 225 yields an AP virtualization mapping 220. The AP virtualization mapping 220 is mainly used in transforming CSI-RS symbols 206 to pilot signals for channel estimation, and thus the AP virtualization mapping 220 is optimized for channel estimation. The CSI-RS symbols 206 are pre-determined pilot symbols known to the UE 280 by some agreement (e.g., a published mobile communication standard) between the BS 210 and the UE 280.

For illustration, FIG. 3 depicts different examples of the AP virtualization mapping 220, where the BS AEs are arranged in a rectangular array of cross-polarized AE pairs. Each pair consists of two of the BS AEs. In a subplot (a), it is shown with three APs each of which is assigned with all the BS AEs of the same polarization, so that beamforming is used in forming a CSI-RS (i.e. a pilot signal). Subplot (b) shows three APs each assigned with only one AE among the BS AEs, thereby producing a non-precoded CSI-RS. As shown in subplot (c), the BS AEs are partitioned into a number of subarrays, each assigned to one AP. Subplot (d) shows a dimension-based virtualization scheme. AP 0 is assigned with a horizontal list of AEs having one polarization. AP 1 is assigned with the AEs on the same horizontal list but the assigned AEs have another polarization. A vertical list of AEs is assigned to AP 2.

In a step 413, the BS generates plural pilot signals for channel estimation by processing the CSI-RS symbols 206 with a first cascade of the AP-to-TXRU virtualization operation 222, an operation of generating the TXUR signals by the TXRUs 224, and the TXRU-to-AE virtualization operation 225. The pilot signals are then transmitted to the UE 280 via the BS AEs 211 of the BS 210.

The UE 280 receives the pilot signals that have been traveled through the MIMO channel 250. Optionally, the UE 280 is equipped with a beamformer 282 for receiving the pilot signals from a selected direction (step 414) for increasing a signal-to-interference-plus-noise ratio (SINR) of the received pilot signals. In a step 415, the UE 280 recovers the CSI-RS symbols (denoted as received CSI-RS symbols, containing channel information) from the received pilot signals. The UE 280 also estimates a first channel transfer function, denoted as $\tilde{H}$, by comparing the received CSI-RS symbols with the originally-sent CSI-RS symbols 206. The first channel transfer function characterizes an end-to-end process of obtaining the received CSI-RS symbols recovered at the UE 280 from the originally-sent CSI-RS symbols. That is, $\tilde{H}=HV_T V_{P(CSI-RS)}$, or $\tilde{H}=UHV_T V_{P(CSI-RS)}$ if the beamformer 282, characterized by a transfer function matrix U, is used. The first channel transfer function is feedback to the BS 210 by the UE 280 via an uplink channel 286. Since the UE 280 only reports $\tilde{H}$ to the BS 210, the computation burden of the UE 280 on computing the CQI, RI and PMI is advantageously eliminated. Furthermore, the AP virtualization mapping 220 is transparent to the UE 280, also advantageously reducing computation overheads at the UE 280.

After receiving $\tilde{H}$ in a step 416, the BS 210 estimates a second channel transfer function, $\hat{H}$, by removing an effect caused by the AP-to-TXRU virtualization operation 222 from the first channel transfer function in a subsequent step 417. That is, $\hat{H}=HV_T$, or $\hat{H}=UHV_T$ if the UE 280 is equipped with the beamformer 282. The estimation can be proceeded in the following ways. As an example for illustration, consider the rectangular array of cross-polarized AE pairs shown in FIG. 3. The subplot (a) reflects a narrow beam based virtualization (as a very narrow beam can be formed by a large number of AEs). A convenient choice of the AP-to-TXRU virtualization matrix is a $V_{P(CSI-RS)}$ such that $V_{P(CSI-RS)}{}^H V_{P(CSI-RS)}=I$. Then $\hat{H}$ can be estimated from $\tilde{H}$ by computing $\hat{H}_{est}=\tilde{H}V_{P(CSI-RS)}{}^H$. If the array is partitioned into a number of subarrays as shown in the subplots (c) and (d), the estimation is done for each subarray, and each estimation for an individual subarray is the same as the one for the narrow beam based virtualization above. The aforementioned method does not utilize a knowledge of SINR of the pilot signals received at the UE 280. If the SINR is also received by the BS 210 from the UE 280 in the step 416, a minimum mean-square error (MMSE) estimation may be used to estimate $\hat{H}$ from $\tilde{H}$ with a greater accuracy.

With a knowledge of $\hat{H}$, the BS 210 determines a modulation scheme, a code rate and an efficiency for the payload data 205 as well as determines a first number of one or more layers for layer mapping the payload data 205 according to the second channel transfer function (step 418). As $\hat{H}$ does not contain $V_{P(CSI-RS)}$, the payload data 205 are mapped to the one or more layers for achieving spatial multiplexing with a degree of spatial multiplexing being dependent on the determined first number without being restricted by the AP-to-TXRU virtualization operation 222 or by the AP virtualization mapping 220. The determination of the modulation scheme, the code rate and the efficiency for the payload data 205 corresponds to the determination of the CQI at the UE 180 of FIG. 1. The determination of the first number of one or more layers for layer mapping the payload data 205 corresponds to the determination of the RI at the UE 180 of FIG. 1. The method disclosed herein advantageously relieves the UE 280 from the burden of computing the CQI and RI. In the step 418, the BS 210 further determines a precoding operation 240, characterized by a precoding matrix W, according to the determined first number and the second channel transfer function. The precoding operation 240 is used for achieving spatial multiplexing or transmit diversity by precoding the payload data 205 after layer mapping. The precoding operation 240 is determined by determining W from the determined first number and $\hat{H}$. In the step 418, the determination of the first number and W is based on $\hat{H}$ rather than $\tilde{H}$. Since $\hat{H}$ does not involve $V_{P(CSI-RS)}$, in some sense $\hat{H}$ is closer to H than $\tilde{H}$ is. It follows that the first number and W that are determined can better utilize the "content" of the MIMO channel 250 in optimizing data-transmission performance.

After channel estimation is done, the BS 210 generates plural data signals from the payload data 205 (step 419) by processing the payload data 205 after layer mapping with a second cascade of the precoding operation 240, the operation of generating the analog TXUR signals by the TXRUs 224, and the TXRU-to-AE virtualization operation 225. The data signals are transmitted to the UE 280 over the MIMO channel 250.

Figure 5:
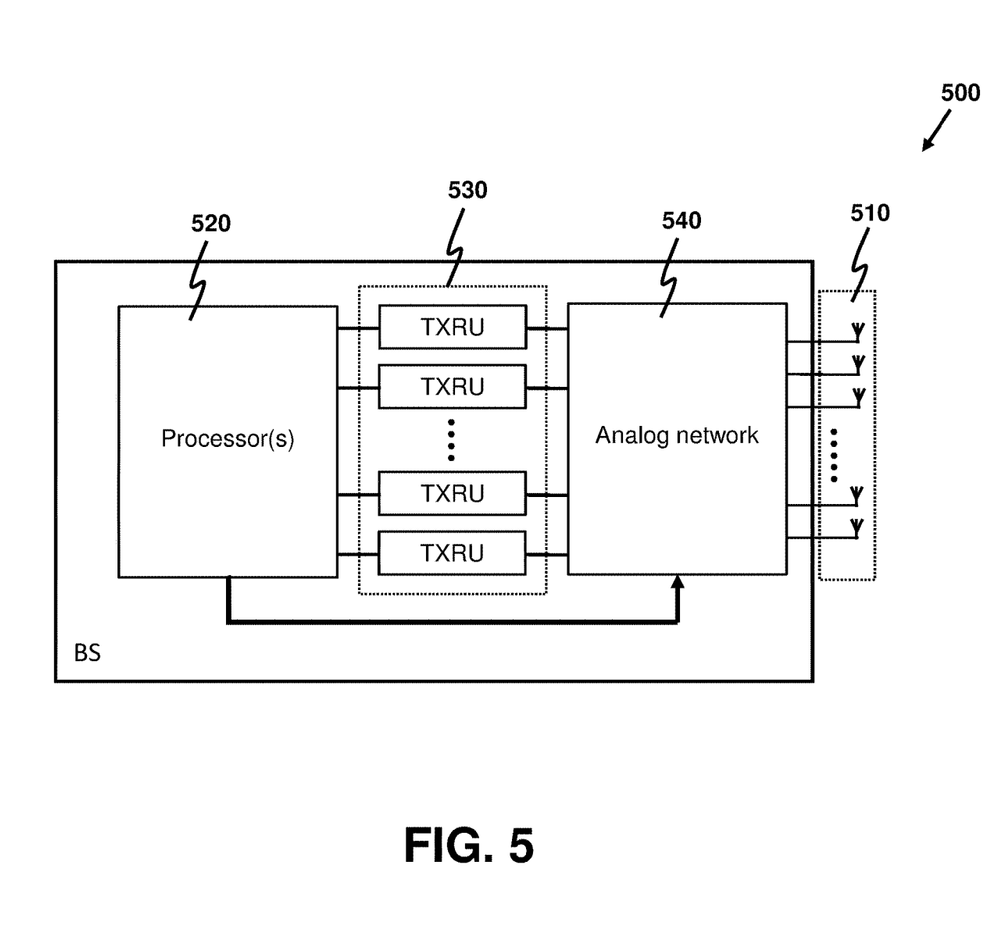
FIG. 5 is a schematic diagram of an exemplary hardware structure of a BS useful for realizing the BS system architecture of FIG. 2.

FIG. 5 exemplarily depicts a schematic diagram of a hardware structure of a BS 500 useful for realizing the BS system architecture of FIG. 2. The BS 500 comprises plural BS AEs 510 connected to an analog network 540. Note that the BS AEs 510 can act as transmit antennas or receive antennas so that the analog network 540 is bi-directionally connected to the BS AEs 510. One use of the analog network 540 is to realize the TXRU-to-AE operation 225. As the TXRU-to-AE operation 225 is usually used for analog beamforming, preferably the analog network 540 comprises plural phase shifters and plural adders for implementing the beamforming function. In additional, the analogy network 540 is reconfigurable in order to realize different instances of the TXRU-to-AE operation 225. The analog network 540 is bi-directionally connected to plural TXRUs 530 (corresponding to the TXRUs 224). The TXRUs 530 are connected to one or more (computing) processors 520 for sending and receiving digital data. The one or more processors 520 perform controlling and computing functions. In particular, the one or more processors 520 control the TXRUs 530 and configure the analog network 540 to realize the TXRU-to-AE operation 225. Those skilled in the art can easily program and configure the one or more processors 520 to perform the following tasks: the determination of the AP-to-TXRU virtualization operation 222 and the TXRU-to-AE operation 225 in the step 412; the execution of the AP-to-TXRU virtualization operation 222 in the step 413; the estimation of $\hat{H}$ in the step 417; the determination of the modulation scheme, the code rate and the efficiency for the payload data 205 in the step 418; the determination of the first number and W in the step 418; and the execution of the precoding operation 240 on the payload data 205 in the step 419.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for transmitting payload data from a base station (BS) having plural BS antenna elements (AEs) to a user equipment (UE) having plural UE AEs via a multiple-input multiple-output (MIMO) channel, the BS having plural transceiver units (TXRUs) each for generating a TXRU signal from an individual modulation-symbol sequence, the method comprising:
    determining, by the BS, an antenna port- (AP-)to-TXRU virtualization operation and a TXRU-to-AE virtualization operation, whereby a concatenation of the AP-to-TXRU virtualization operation and the TXRU-to-AE virtualization operation yields an AP virtualization mapping;
    generating, by the BS, plural pilot signals for channel estimation by processing pre-determined channel state information-reference signal (CSI-RS) symbols with a first cascade of the AP-to-TXRU virtualization operation, an operation of generating the TXUR signals by the TXRUs, and the TXRU-to-AE virtualization operation, whereby the pilot signals are transmitted to the UE via the BS AEs;
    receiving, by the BS, a first channel transfer function from the UE, wherein the first channel transfer function characterizes an end-to-end process of obtaining received CSI-RS symbols recovered at the UE from the pre-determined CSI-RS symbols;
    estimating, by the BS, a second channel transfer function by removing, from the first channel transfer function, an effect caused by the AP-to-TXRU virtualization operation;
    according to the second channel transfer function, determining, by the BS:
        a modulation scheme, a code rate and an efficiency for the payload data;
        a first number of one or more layers for layer mapping the payload data whereby the payload data are mapped to the one or more layers for achieving spatial multiplexing with a degree of spatial multiplexing being dependent on the determined first number without being restricted by the AP virtualization mapping; and
        a precoding operation, the precoding operation being used for achieving spatial multiplexing or transmit diversity by precoding the payload data after layer mapping;
    and
    generating, by the BS, plural data signals from the payload data by processing the payload data after layer mapping with a second cascade of the precoding operation, the operation of generating the analog TXUR signals by the TXRUs, and the TXRU-to-AE virtualization operation, whereby the data signals are transmitted to the UE over the MIMO channel.

2. The method of claim 1, further comprising:
    receiving, by the BS, a signal-to-interference-plus-noise ratio (SINR) of the pilot signals received at the UE, whereby the BS uses the SINR to estimate the second channel transfer function by minimum mean-square error (MMSE) estimation.

3. The method of claim 1, wherein the AP-to-TXRU virtualization operation is determined according to the UE-specific channel statistics.

4. The method of claim 1, further comprising:
    after the pilot signals travel through the MIMO channel and are received at the UE, recovering, by the UE, the received CSI-RS symbols from the received pilot signals;
    estimating, by the UE, the first channel transfer function by comparing the received CSI-RS symbols with the pre-determined CSI-RS symbols; and
    sending, by the UE, the first channel transfer function to the BS.

5. The method of claim 4, further comprising:
    processing, by the UE, the received pilot signals with a beamforming operation for increasing a signal-to-interference-plus-noise ratio (SINR) before recovering the received CSI-RS symbols.

6. A base station (BS) comprising:
    plural BS antenna elements (AEs);
    plural transceiver units (TXRUs) each for generating a TXRU signal from an individual modulation-symbol sequence;
    an analog network for realizing a TXRU-to-AE virtualization operation that processes and maps the plural TXRU signals generated by the TXRUs to the BS AEs for transmission; and
    one or more processors for performing computing and controlling functions, the controlling functions including controlling the TXRUs, and configuring the analog network to realize the TXRU-to-AE virtualization operation;
    wherein the TXRUs, the analog network and the one or more processors are arranged to transmit payload data from the BS to a user equipment (UE) having plural UE AEs via a multiple-input multiple-output (MIMO) channel by the method of claim 1.

7. The BS of claim 6, wherein the BS AEs are arranged as a rectangular array of cross-polarized AE pairs, each AE pair consisting of two of the BS AEs.

8. The BS of claim 6, wherein the analog network comprises plural phase shifters and plural adders.

9. A base station (BS) comprising:
    plural BS antenna elements (AEs);
    plural transceiver units (TXRUs) each for generating a TXRU signal from an individual modulation-symbol sequence;
    an analog network for realizing a TXRU-to-AE virtualization operation that processes and maps the plural TXRU signals generated by the TXRUs to the BS AEs for transmission; and
    one or more processors for performing computing and controlling functions, the controlling functions including controlling the TXRUs, and configuring the analog network to realize the TXRU-to-AE virtualization operation;
    wherein the TXRUs, the analog network and the one or more processors are arranged to transmit payload data from the BS to a user equipment (UE) having plural UE AEs via a multiple-input multiple-output (MIMO) channel by the method of claim 2.

10. The BS of claim 9, wherein the BS AEs are arranged as a rectangular array of cross-polarized AE pairs, each AE pair consisting of two of the BS AEs.

11. The BS of claim 9, wherein the analog network comprises plural phase shifters and plural adders.

12. A base station (BS) comprising:
 plural BS antenna elements (AEs);
 plural transceiver units (TXRUs) each for generating a TXRU signal from an individual modulation-symbol sequence;
 an analog network for realizing a TXRU-to-AE virtualization operation that processes and maps the plural TXRU signals generated by the TXRUs to the BS AEs for transmission; and
 one or more processors for performing computing and controlling functions, the controlling functions including controlling the TXRUs, and configuring the analog network to realize the TXRU-to-AE virtualization operation;
wherein the TXRUs, the analog network and the one or more processors are arranged to transmit payload data from the BS to a user equipment (UE) having plural UE AEs via a multiple-input multiple-output (MIMO) channel by the method of claim 3.

13. The BS of claim 12, wherein the BS AEs are arranged as a rectangular array of cross-polarized AE pairs, each AE pair consisting of two of the BS AEs.

14. The BS of claim 12, wherein the analog network comprises plural phase shifters and plural adders.

\* \* \* \* \*